United States Patent [19]

Kirschner et al.

[11] Patent Number: 5,218,826

[45] Date of Patent: Jun. 15, 1993

[54] FOOD REFRIGERATION SYSTEM AND METHOD INCORPORATING A CRYOGENIC HEAT TRANSFER APPARATUS AND METHOD

[75] Inventors: Mark J. Kirschner, Morristown; William Kulik, Cranford; Rustam Sethna, Scotch Plains; Ron C. Lee, Bloomsbury, all of N.J.

[73] Assignee: The BOC Group, Inc., New Providence, N.J.

[21] Appl. No.: 918,903

[22] Filed: Jul. 22, 1992

Related U.S. Application Data

[63] Continuation of Ser. No. 633,901, Dec. 26, 1990.

[51] Int. Cl.⁵ .................. F25D 9/00; F25D 13/06; F25D 17/02; A23L 3/375
[52] U.S. Cl. .................................... 62/48.1; 62/63; 62/64; 62/65; 62/434
[58] Field of Search ............... 62/48.1, 50.6, 62, 63, 62/64, 65, 434

[56] References Cited

U.S. PATENT DOCUMENTS

| | | |
|---|---|---|
| 1,922,712 | 8/1933 | Randel . |
| 3,048,989 | 8/1962 | Morrison . |
| 3,187,514 | 6/1965 | Rendos . |
| 3,238,736 | 3/1966 | MacIntosh . |
| 3,297,454 | 1/1967 | Webster et al. . |
| 3,404,989 | 10/1968 | Hirtensteiner . |
| 3,413,818 | 12/1968 | Pelmulder . |
| 3,427,820 | 2/1969 | Hart .................. 62/65 X |
| 3,440,831 | 4/1969 | Thompson .............. 62/63 |
| 3,498,070 | 3/1970 | Allen et al. . |
| 3,533,973 | 1/1971 | Moran .................. 62/65 X |
| 3,672,182 | 6/1972 | Stowasser et al. ........ 62/98 |
| 3,805,538 | 4/1974 | Fritch, Jr. et al. ....... 62/63 |
| 3,831,389 | 8/1974 | Lipona .................. 62/63 |
| 3,932,155 | 1/1976 | Pietrucha et al. ........ 62/10 |
| 4,237,695 | 12/1980 | Oberpriller et al. ..... 62/63 |
| 4,367,630 | 1/1983 | Bernard et al. ......... 62/63 |
| 4,403,479 | 9/1983 | Rasovich .............. 62/63 |
| 4,852,358 | 8/1989 | Acharya et al. ........ 62/63 |
| 4,856,285 | 8/1989 | Acharya et al. ........ 62/63 |

FOREIGN PATENT DOCUMENTS

| | | | |
|---|---|---|---|
| 0062972 | 4/1985 | Japan | 62/63 |
| 0189679 | 12/1962 | U.S.S.R. | 62/64 |

Primary Examiner—Henry A. Bennet
Assistant Examiner—Christopher B. Kilner
Attorney, Agent, or Firm—David M. Rosenblum; Larry R. Cassett

[57] ABSTRACT

The present invention provides a food processing system and method for refrigerating articles of food. The food processing system includes at least two cooling stages formed by a cryogenic freezer and a hydrocooler. The cryogenic freezer receives the articles of food and transfers heat from the articles of food to the cryogen so that the articles of food are refrigerated. After the transfer of heat from the articles of food to the cryogen, the cryogen boils off to form cryogenic vapor. The hydrocooler receives the articles of food prior to the cryogenic freezer and transfers heat from the articles of food to supplied cooling water. Such heat transfer reduces the quantity of cryogen required to refrigerate the articles of food. Additionally, an eductor is connected to a pump and to vent line from the cryogenic freezer. The cooling water is pumped through the eductor to suction cryogenic vapor from the cryogenic freezer and to mix the cryogenic vapor and the cooling water prior to reception of the cooling water in the hydrocooler. Such mixing transfers heat from the cooling water to the cryogenic vapor to increase the heat transfer between the articles and the cooling water in the hydrocooler. As a result of such increased heat transfer, the amount of cryogen required in refrigerating the articles is further reduced. The eductor and pump combination has general application to the cooling of articles.

11 Claims, 3 Drawing Sheets

FOOD REFRIGERATION SYSTEM AND METHOD INCORPORATING A CRYOGENIC HEAT TRANSFER APPARATUS AND METHOD

This is a continuation of application Ser. No. 07/633,901 filed Dec. 26, 1990.

BACKGROUND OF THE INVENTION

The present invention relates to a food refrigeration system and method having two or more cooling stages in which food is refrigerated by transferring heat from the food to cooling water and then to a cryogen causing the cryogen to boil off into a cryogenic vapor. The present invention also relates to a method and apparatus for cooling articles that has particular application to the aforementioned food refrigeration system and method in which the cooling potential of the cryogenic vapor is recovered in the cooling water by drawing the cryogen vapor into a mixture with the cooling water through use of an eductor.

The prior art has provided food refrigeration systems for refrigerating articles of food by transferring heat from the articles of food in sequential cooling stages. In such refrigeration systems, a first of the cooling stages can comprise a hydrocooler and a second of the cooling stages can comprise a cryogenic freezer, such as a liquid nitrogen immersion freezer or a post cooling tunnel used in conjunction with a liquid nitrogen immersion freezer or a carbon dioxide spiral belt freezer. A third cooling stage can be formed by a mechanical freezer. The hydrocooler, by provision of a waterbath or water shower arrangement, pre-chills the food with cooling water, either ground water supplied by a ground water well or tap water supplied by a municipal water supply or brine. In the cryogenic freezer, food is chilled to a temperature above freezing, crust frozen, or frozen throughout by a bath or spray of cryogen. When a cryogenic freezer is used in crust freezing food, the mechanical freezer is provided to complete the freezing of the food by transferring heat from the food to a recirculating refrigerant such as ammonia.

The number and types of cooling stages used in a particular food refrigeration system relate to the degree of refrigeration required and the particular food involved. For example, a food refrigeration system used in freezing fruit may consist of, in order, a hydrocooler, a liquid nitrogen immersion freezer and post cooling tunnel, and a mechanical freezer. In such a food refrigeration system, the hydrocooler is used to pre-chill the fruit, the liquid nitrogen immersion freezer and post cooling tunnel are used to crust freeze the fruit and the mechanical freezer is used to freeze the fruit throughout. The initial crust freezing of the fruit prevents the cellular damage to the fruit that would otherwise occur if the fruit were solely frozen throughout in a mechanical freezer. Another food refrigeration system may be formed by a hydrocooler and a liquid nitrogen immersion freezer without a post cooling tunnel; or a hydrocooler and a carbon dioxide spiral belt freezer. Such a refrigeration system could be used to freeze vegetables throughout without first crust freezing the vegetables. A liquid nitrogen immersion freezer may be used alone as a chiller to prevent articles of food, which in one stage of their processing are hot and sticky, from sticking to conveyor belts employed in moving the food through a food processing system. In accordance with the above discussion, it is to be noted that the term, "refrigeration" as used herein encompasses freezing, crust freezing and chilling.

In any of the food refrigeration system, discussed above, the cryogen in the cryogenic freezer is continually being expended in that the heat transfer to the cryogen causes the cryogen to boil off into cryogenic vapor which is vented from the refrigeration system. Thus, the cryogen must be continually replenished. The hydrocooler reduces the operating costs involved in continually replenishing the cryogen because the initial heat transfer to the cooling water in the hydrocooler decreases the cryogen requirements in the cryogenic freezer by pre-chilling the articles of food. As may be appreciated, any refrigeration effect requires a predetermined amount of heat transfer. The distribution of such heat transfer between a hydrocooler and a cryogenic freezer decreases the amount of heat transfer between the cryogen and the food and thus, the cryogen requirement in the cryogenic freezer. It is appropriate to point out that the hydrocooler may also serve to rinse debris and surface contaminants from the articles to be eventually frozen.

In an additional conservation method, which can form still another cooling stage of a food processing system, cryogenic vapor, such as boiled off in a liquid nitrogen immersion freezer, may be used to pre-cool the articles of food prior to immersion in order to conserve the amount of cryogen needed for the particular refrigeration operation. A problem with using cryogenic vapor in this manner is that food articles tend to become dehydrated; and such dehydration results in a loss of food flavoring. Also, such pre-chillers using cryogenic gas are relatively inefficient at heat removal.

As may be appreciated, refrigeration systems, such as those discussed above, are run for long periods of time. One major expense involved in the long running period of such refrigeration systems is in the rate of cryogen usage. An additional expense involves water usage. As will be discussed hereinafter, the present invention conserves both the cryogen and water to reduce such expenses.

SUMMARY OF THE INVENTION

In one aspect, the present invention provides a food processing system and method for refrigerating food. The system comprises a supply of a cryogen, a source of cooling water, and at least two sequential cooling stages for transferring an amount of heat from the food sufficient to refrigerate the articles of food. The cooling water has a temperature lower than that of the food to define a temperature difference between the food and the cooling water. In a first of the at least two sequential cooling stages, means are provided, such as a hydrocooler, for transferring a portion of the amount of heat from the articles to the cooling water in proportion to the temperature difference between the food and the cooling water. A second of the at least two sequential cooling stages has means, such as a cryogenic freezer, for transferring a remaining portion of the amount of heat from the food to the cryogen so that a quantity of the cryogen boils off into a cryogenic vapor and is thereby expended.

The degree to which the cryogen is expended is decreased over prior art hydrocooler and cryogenic freezer arrangements by means, preferably a pump connected to the source of cooling water and an eductor connected to the pump and to the second of the at least two sequential cooling stages. Such means transfer further heat from the cooling water to the cryogenic vapor and thereby increase the temperature difference between the food and the cooling water. Delivery means are provided for thereafter delivering the cooling water to the first of the at least two sequential cooling stages. As a result, the portion of heat transferred from the food to cooling water is increased and the remaining portion of heat transferred from the articles to the cryogen is reduced along with the quantity of the cryogen expended. In a related aspect of the present invention, the delivery means can comprise a phase separation tank into which the cooling water is discharged from the eductor. Cooling water may be recycled from the first of the at least two cooling stages back to the phase separation tank instead of being discharged into a municipal sewer. As a result, the rate of water usage can also be reduced over prior art refrigeration systems.

In accordance with the method of the present invention, a cryogen is supplied along with cooling water at a temperature lower than that of the food to define a temperature difference between the food and the cooling water. An amount of heat is transferred from the articles in at least two sequential cooling stages so that the articles are refrigerated. In a first of the at least two sequential cooling stages, a portion of the amount of heat is transferred from the food to the cooling water in proportion to the temperature difference between the food and the cooling water, and in a second of the at least two sequential cooling stages, a remaining portion of the amount of heat is transferred from the food to the cryogen so that a quantity of the cryogen boils off into a cryogenic vapor and is thereby expended. Further heat is also transferred from the cooling water to the cryogenic vapor to increase the temperature difference between the food and the cooling water. Thereafter the cooling water is delivered to the the first of the at least two sequential cooling stages so that the portion of heat transferred from the articles to the cooling water is increased and the remaining portion of heat transferred from the food to the cryogen is reduced along with the quantity of the cryogen expended.

In a further aspect, the present invention provides an apparatus and method of cooling an article with a motive fluid having a temperature lower than that of the article. The apparatus comprises a source of the motive fluid, a source of cryogenic vapor, heat transfer means, a pump, eductor means and delivery means. The heat transfer means are provided for transferring heat from the article to the motive fluid. The pump has an inlet connected to the source of motive fluid and an outlet. The eductor means is connected to the outlet of the pump and the source of cryogenic vapor for drawing the cryogenic vapor into a mixture with the motive fluid, thereby effecting further heat transfer from the motive fluid to the cryogenic vapor and lowering the temperature of the motive fluid. The delivery means deliver the motive fluid from the eductor means to the heat transfer means. As a result, the heat transfer from the article to the motive fluid and thus, the cooling of the article are enhanced by the lower temperature the motive fluid.

In accordance with the further aspect, the present invention provides a method of cooling an article with a motive fluid having a temperature lower than that of the article. In accordance with the method, the motive fluid and a cryogenic vapor are supplied and heat is transferred from the article to the motive fluid thereby to cool the article. Prior to the heat transfer from the article to the motive fluid, the motive fluid is pumped through eductor means for drawing the cryogenic vapor into a mixture with the motive fluid and thereby transferring further heat from the motive fluid to the cryogenic vapor and lowering the temperature of the motive fluid. As a result, the heat transfer from the article to the motive fluid and the cooling of the article are enhanced by the lower temperature of the motive fluid.

BRIEF DESCRIPTION OF THE DRAWINGS

While the specification concludes with claims particularly pointing out the subject matter that applicants regard as their invention is believed that the invention will be better understood from the following description taken in conjunction with accompanying drawings in which:

DETAILED DESCRIPTION

Figure 1:
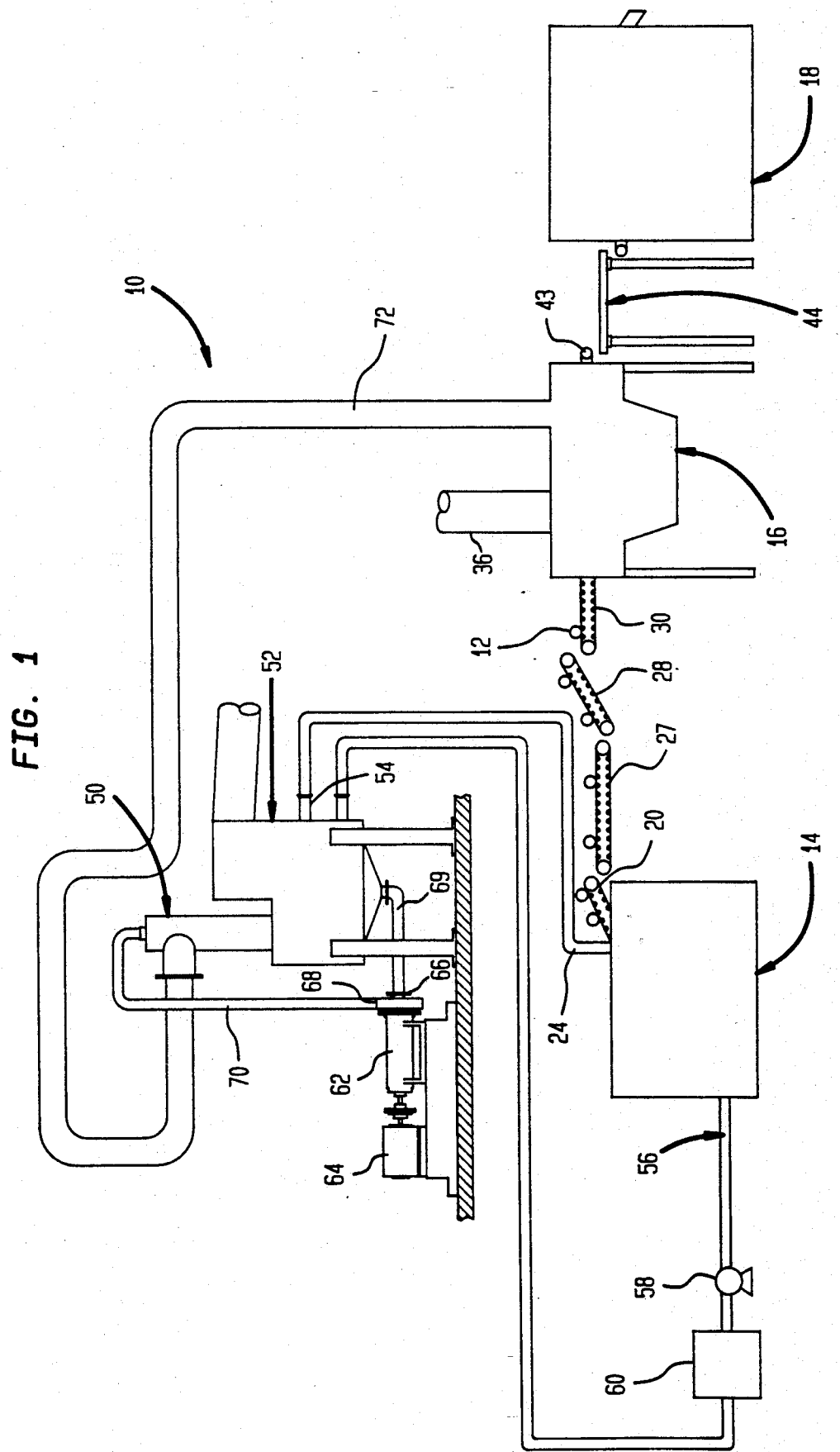
FIG. 1 is a schematic illustration of an apparatus in accordance with the present invention.
Figure 2:
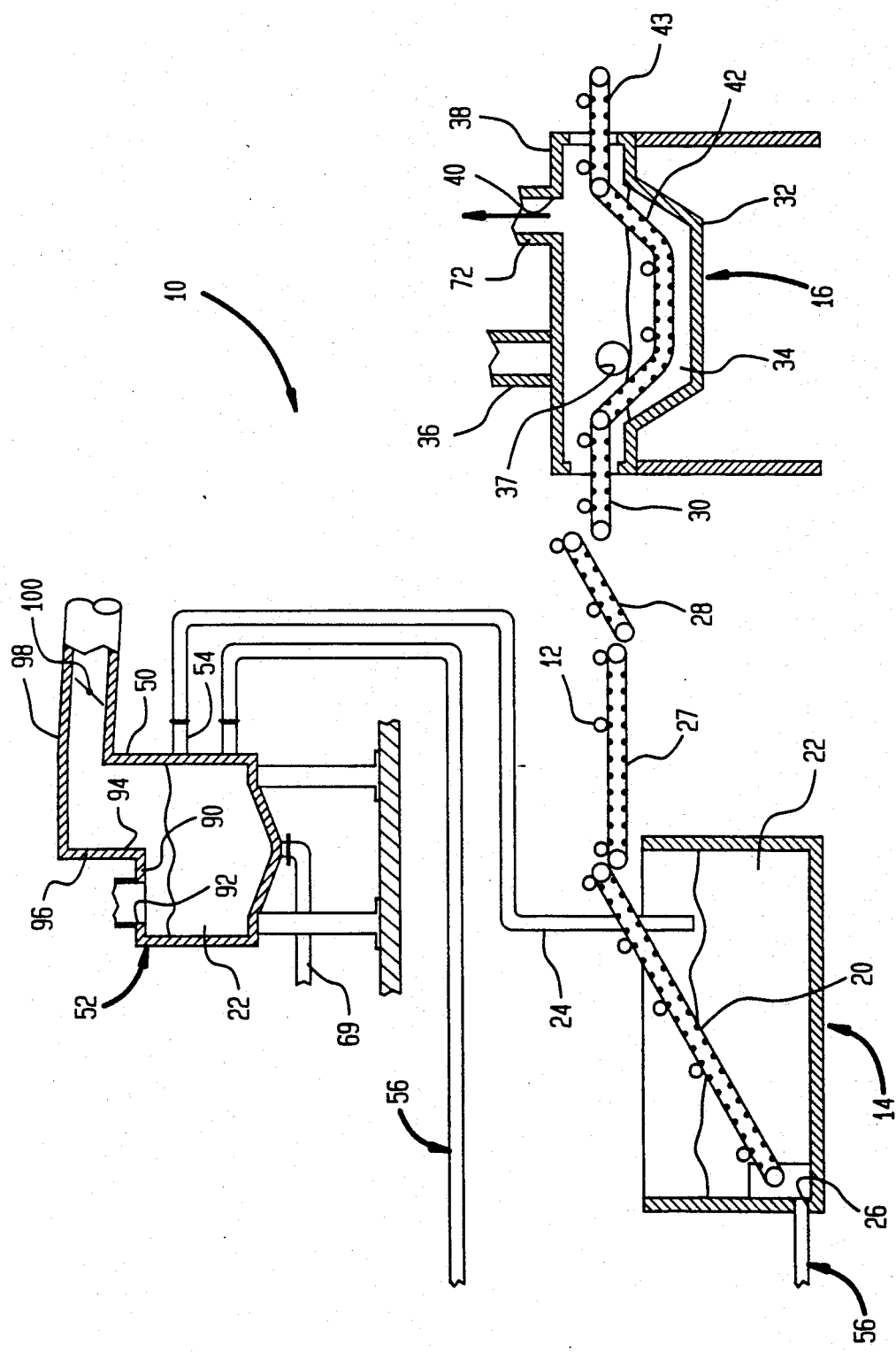
FIG. 2 is a fragmentary cross-sectional view of FIG. 1.

With reference to FIGS. 1 and 2, a food refrigeration system 10 in accordance with the present invention is illustrated. Food processing system 10 is utilized in the freezing of food 12 and is provided with three cooling stages formed by a hydrocooler 14, a liquid nitrogen immersion freezer 16, and a mechanical freezer 18. Food refrigeration system 10 is designed to be used in a seafood processing plant and food 10 comprises clams to be frozen for preservation purposes.

The food is first loaded onto a conveyor belt 20 located within hydrocooler 14. Hydrocooler 14 is of tank-like construction and contains cooling water 22 that is supplied by a delivery-pipe 24 and is drained from a drain 26. Cooling water 22 has a temperature lower than that of food 12 to produce a temperature difference by which heat is transferred from food 12 to cooling water 22.

After such heat transfer, food 12 is carried from hydrocooler 14 by conveyor 20 and deposited on central, horizontal conveyor 27. Food is next deposited on inclined conveyor 28 which deposits food 12 on an inlet conveyor 30 of liquid nitrogen immersion freezer 16. As illustrated, liquid nitrogen immersion freezer 16 consists of a trough 32 for receiving liquid nitrogen 34. Liquid nitrogen 34 is supplied via an inlet pipe 36 having an opening 37. Trough 34 is covered by an insulated cover 38 having a vent 40. Food 12 is immersed in liquid nitrogen 34 via a conveyor 42 and is expelled by an outlet conveyor 43 onto a shake table 44.

During immersion of food 12, heat is transferred from food 12 to liquid nitrogen 34. Such heat transfer causes liquid nitrogen 34 to boil off into a cryogenic vapor of about 77K. It is to be noted that immersion freezer 16 can be a CIF-300 Series Liquid Nitrogen Immersion Freezer manufactured by Koach Engineering MFG, Inc. of 8950 Glenoaks Blvd., Sun Valley, Calif., 91352-2059.

Shake table 44 conducts food 12 to mechanical freezer 18 which can be a fluidized bed freezer, specifically a Lewis IQF Freezer Series or a Flo-Freeze Series Freezer, manufactured by FrigoScandia Contracting, AB of Rushhallsgatan 21, S-251 09 Helsingborg, Sweden.

In food processing system 10, hydrocooler 14 functions to pre-chill and clean food 12 before being crust frozen in liquid nitrogen immersion freezer 16. After being crust frozen in liquid nitrogen immersion freezer 16, freezing is completed, that is food 12 is frozen throughout, in mechanical freezer 18.

In food processing system 10, the amount of heat required to be transferred from food 12 in the crust freezing of food 12 is distributed between hydrocooler 14 and liquid nitrogen immersion freezer 16. In other words, a portion of the heat required to be transferred from food 12 is transferred to cooling water 14 and a remaining portion of the heat required to be transferred to liquid nitrogen 34. As may be appreciated, the greater the amount of heat transferred between food 12 and cooling water 14, the less heat transfer will be required between food 12 and liquid nitrogen 34. The lower this latter heat transfer, the less quantity of liquid nitrogen 34 that will boil off into a vapor and hence the lower the rate that liquid nitrogen 34 will be required to be supplied to liquid nitrogen immersion freezer 16.

In the prior art, the temperature of cooling water 22, as supplied by ground water or municipal water supply, is lower than that of food 12 and hence, there is some degree of heat transfer between food 12 and cooling water 22. In accordance with the present invention, the cryogen, in this case liquid nitrogen, is further conserved by recovering the cooling potential of the nitrogen vapor in cooling water 22. The cooling potential of the nitrogen vapor is recovered by transferring further heat from cooling water 22 to the nitrogen vapor prior to the reception of cooling water 22 in hydrocooler 14. As a result of such further heat transfer between cooling water 22 and the nitrogen vapor, the temperature of cooling water 22 is lowered and thus, there exists a greater degree of heat transfer between cooling water 22 and food 12 over the prior art. Consequently, cryogen requirements are further reduced over hydrocooler and cryogenic freezer arrangements of the prior art.

A major problem in recovering the cooling potential of the nitrogen vapor, is that the nitrogen vapor venting from liquid nitrogen immersion freezer 16, can have a temperature as low as 77K, or in other words, low enough to freeze water. This problem is solved in the present invention by accomplishing the heat transfer between cooling water 22 and boiled off nitrogen vapor in eductor 50. As will be discussed, eductor 50 is connected to a phase separation tank 52 in which cooling water 22 accumulates. Accumulated cooling water 22 is preferably gravity fed from an outlet 54 of phase separation tank 52 to hydrocooler 14 via delivery line 24 connected to outlet 54. After having had heat transferred from food 12 to cooling water 22, cooling water 22 drains through drain 26 of hydrocooler 14 and is recycled to phase separation tank 52 via a recycle line 56 having an in-line recycle pump 58 and an optional filter 60, used when cooling water 22 is also used in cleaning food 12.

Cooling water 22 is pumped through eductor 50 by a pump 62, powered by an electric motor 64. Pump 62 has an inlet 66 and an outlet 68. A transfer pipe 69 communicates between inlet 66 of pump 62 and the bottom of phase separation tank 52. An outlet pipe 70 communicates between outlet 68 of pump 62 and eductor 50. Additionally, eductor 50 is connected to vent 40 of liquid nitrogen immersion freezer 16 by a vent duct 72.

Pump 62 pumps cooling water 22 through eductor 50, which in turn, draws the boiled off nitrogen vapor into a mixture with cooling water 22. As a result of such mixing, heat is directly transferred from cooling water 22 to the nitrogen vapor. Although cooling water 22 may freeze to some degree at or near the center of the central passageway 76, the constant flow of cooling water 22 prevents freezing from occurring throughout th entire cross-section of central passageway 76. Any such frozen water would subsequently thaw in phase separation tank 52.

Figure 3:
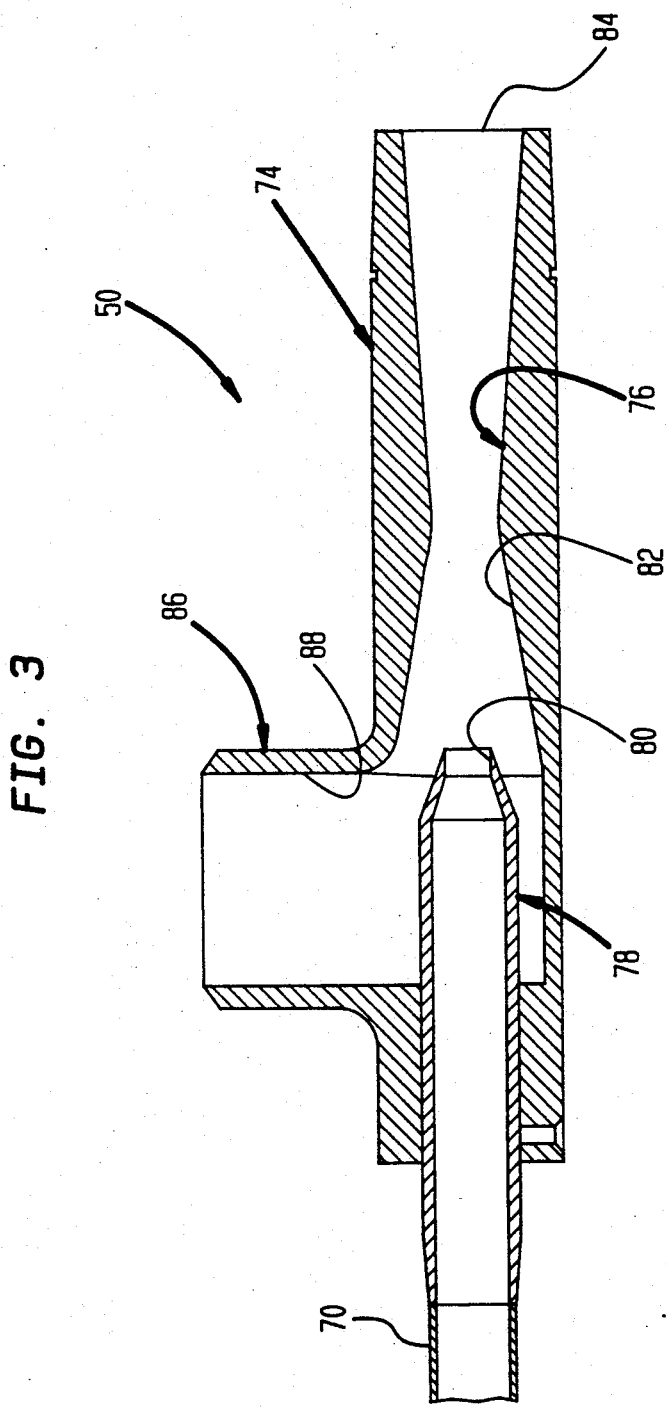
FIG. 3 is a cross-sectional view of an eductor in accordance with the present invention used in FIG. 1.

With reference to FIG. 3, a preferred embodiment of eductor 50 is illustrated. Eductor 50 includes a body portion 74 having a central passageway 76. In one end of central passageway 76, an internal nozzle 78 is connected to body portion 74. Internal nozzle 78 is in turn connected, at one end, to outlet pipe 70. The other end of internal nozzle 78 defines nozzle orifice 80 within central passageway 76. Beyond nozzle orifice 80, central passageway 76 gradually reduces in transverse cross-sectional area to a central region 82 and then gradually increases to form a discharge opening 84. Body portion 74 is also provided with a gas inlet section 86 connected to vent duct 72. Gas inlet opening section 86 is provided with an inlet passage 88 in communication with central passageway 76 near restriction orifice 80.

As may be appreciated, cooling water 22 undergoes a drop in pressure when passing through restriction orifice 80. The drop in pressure in turn produces a low pressure region in central passageway 76 of eductor 50 which draws the nitrogen vapor through vent duct 72 and into a mixture with pumped cooling water 22. The mixing of the nitrogen vapor and cooling water 22 occurs within central passageway 76, beyond nozzle orifice 80. Maximum mixing occurs in central region 82. Thereafter, a mixture of cooling water 22 and nitrogen vapor is discharged from eductor 50 through its discharge orifice 84.

Discharge opening 84 of eductor 50 can be mounted on a suitable mounting (not illustrated) to directly deliver the cooling water from eductor 50 to hydrocooler 14. However, since the flow of discharge cooling water 22 is violently erratic, it is preferable to first separate the nitrogen vapor from cooling water 22 before delivering cooling water 22 to hydrocooler 14. It is also preferable to separate the nitrogen vapor from cooling water 22 so that the nitrogen vapor is conducted some distance from the work area surrounding food refrigeration system 10 in order to safeguard the health of workers. In addition to the foregoing, it is important that no flow restriction be placed in the path of cooling water and nitrogen vapor discharge from eductor 34. Such a flow restriction could cause eductor 34 to overflow.

In the present invention, the nitrogen vapor is separated from cooling water 22 and the mixture of nitrogen vapor and cooling water 22 is discharged from eductor 50 without flow restriction by discharging cooling water 22 from eductor 50 into phase separation tank 52. Although phase separation tank can be constructed so as to be open at the top thereof, preferably it is provided with a top wall 90 having two openings 92 and 94.

Eductor 50 is connected to top wall 90 with its discharge opening 84 aligned with opening 92. A vent 96 is also connected to top wall 90 in alignment with the other opening 94. Cooling water 22 discharged from eductor 50 is thus, discharged into phase separation tank 52. At the same time, nitrogen vapor separates from cooling water 22 and is vented through nitrogen conduit 96 at some distance from the work area surrounding food refrigeration system 10. As mentioned previously, cooling water 22 accumulated in phase separation tank 52, gradually feeds to hydrocooler 14 by provision of a delivery pipe 24 connected to outlet 54. It is to be noted that although cooling water 22 may be recycled through recycle pipe 56, this is entirely optional and instead, cooling water may be drained simply into the municipal sewer system, with of course, the greater concomitant expense of continually supplying cooling water.

A nitrogen exhaust outlet 98 having a butterfly damper 100 can be connected to vent 96. As may be appreciated by those skilled in the art, the degree to which nitrogen vapor is suctioned by eductor 50 is dependent upon a difference in pressure of the cryogenic vapor as measured between inlet passage 88 and discharge opening 84. The greater this difference in pressure, the greater the rate at which nitrogen vapor is suctioned by eductor 50. Butterfly damper 100 is operable to change the area of exhaust outlet 98 by rotating between positions in which exhaust outlet 98 is open and closed. As exhaust outlet 98 is closed by damper 100, the back pressure within eductor 50 increases, that is the pressure at discharge opening 84. This results in nitrogen vapor being suctioned into eductor 50 to a lesser extent and thus, lowering the temperature of cooling water 22 to a lesser degree.

In the illustrated preferred embodiment, electric motor 64 is rated at about 15.0 horsepower. Eductor 50 is designed to draw nitrogen vapor at about 2,000.0 Kg/hr., and at a temperature of about 200.0K. Cooling water 22 is pumped through eductor 50 at about 227.0 liters/minute. Recycle pump 58 is identical to pump 62 and is powered by an electric motor also rated at about 15.0 horsepower so as to pump recycle cooling water 22 at about 113.0 liters/minute. The entry pressure of cooling water 22 in eductor 50 is about $4.05 \times 10^5$ pascals and the mixture of cooling water and nitrogen vapor is discharged at about atmospheric pressure. Eductor 50 is designed with restriction orifice 80 having a diameter of about 1.50 cm.; gas inlet section 86 having an internal diameter of 25.4 cm.; central region 82 having a diameter of about 10.16 cm.; and discharge opening 84 having a diameter of about 25.4 cm. Hydrocooler is designed to hold about 400.0 liters and phase separation tank 52 is designed to accumulate 340.0 liters of cooling water 22.

The food refrigeration system, described above, is designed to freeze clams at a rate of about 2200.0 Kg/hr. with liquid nitrogen being supplied at about 2,000.0 Kg/hr. In the prior art, the cooling water supplied to hydrocooler 14 is either municipal water or well water having a temperature of 290K. In accordance with the present invention, the cooling water can be reduced in temperature to about 275.0K. The increased temperature spread between the clams and cooling water 22 results in a savings of liquid nitrogen of as much as 20.0%. The percentage reduction in the nitrogen consumption will of course decrease with increasing system thermal inefficiencies. Conversely, it will increase with decreasing temperature of the nitrogen vapor vented from the immersion freezer.

Although the preferred embodiment has been illustrated with reference to a food refrigeration system 10 having three cooling stages, the present invention would have equal applicability to other food refrigeration systems having two or greater number of cooling stages. For instance, if it were desired for a food article to simply be frozen without first being crust frozen, the food refrigeration system might comprise a hydrocooler and a liquid nitrogen immersion freezer. The conveyor belt associated with such liquid nitrogen immersion freezers would be set to run at a rate such that the resident time of articles of food in the immersion freezer were sufficient to completely freeze food articles. In a like embodiment, it would also be possible to replace the immersion freezer with a carbon dioxide spiral belt freezer. In such an embodiment, carbon dioxide vapor venting from such a freezer would be drawn into an eductor for mixture with the cooling water flowing to the hydrocooler. In addition to the foregoing, the present invention could be adapted for use in a food processing system in which a liquid nitrogen immersion freezer were utilized as a chiller. In such a system, a hydrocooler and eductor arrangement would have to be added.

Eductor 50 and pump 62 form an invention in their own right. Such invention in its broadest aspects comprises an apparatus and method for cooling an article with a motive fluid. In food refrigeration system 10, the motive fluid is cooling water 22 which is pumped through eductor 50 to draw cryogenic vapor into a mixture with the cooling water and thereby lower the temperature of cooling water 22. Cooling water 22 having had its temperature lowered is then supplied to a heat transfer device, hydrocooler 14, to effect an enhanced heat transfer from the article, which comprises food 12, to cooling water 22.

As may be appreciated, such invention has broader applications that lie beyond food refrigeration system 10. For instance, a motive fluid, such as water, could be pumped through an eductor connected to any source of cryogenic vapor and the discharge of water could be directed against an article to be cooled with an enhanced heat transfer rate.

Although preferred embodiments have been shown and described in detail, it would be readily understood and appreciated by those skilled in the art, that numerous omissions, changes, and additions may be made without departing from the spirit and scope of the invention.

I claim:

1. In a refrigeration apparatus for refrigerating food comprising:

a supply of a cryogen;

a source of cooling water having a temperature lower than that of the food to define a temperature difference between the food and the cooling water; and at least two sequential cooling stages for transferring an amount of heat from the food sufficient to refrigerate the food;

a first of the at least two sequential cooling stages having means for transferring a portion of the amount of heat from the food to the cooling water in proportion to the temperature difference between the food and the cooling water; and a second of the at least two sequential cooling stages having means for transferring a remaining portion of the amount of heat from the food to the cryogen so that the food is refrigerated and a quantity of the cryogen coils off into a cryogenic vapor and is thereby expended; the improvement comprising:

a pump having an inlet connected to the source of cooling water and an outlet;

eductor means connected to the outlet of the pump and the second of the at least two sequential cooling stages for drawing the cryogenic vapor into a mixture with the cooling water and thereby effectuating further heat transfer between the cooling water and the cryogenic vapor to increase the temperature difference between the food and the cooling water; and delivery means for delivering the cooling water form the eductor means to the first of the at least two sequential cooling stages, whereby the portion of the amount of heat transferred form the food to the cooling water is increased in proportion to the increased temperature difference between the food and the cooling water and the remaining portion of the amount of heat transferred from the food to the cryogen is thereby reduced along with the quantity of the cryogen expended.

2. The improvement of claim 1, wherein the delivery means includes phase separation means for separating the cryogenic vapor from the cooling water.

3. The improvement of claim 2, wherein:
the eductor means has a discharge opening through which the mixture of cooling water and cryogenic vapor is discharged; and
the delivery means comprises:
a phase separation tank to form the phase separation means, the phase separation tank positioned beneath the discharge opening of the eductor means to separate the cryogen vapor from the cooling water, to accumulate the cooling water, and to vent the cryogenic vapor from the top of the phase separation tank; and
a delivery line connecting the phase separation tank to the first of the at least two sequential cooling stages.

4. The improvement of claim 3, wherein:
the first of the at least two sequential cooling stages has a drain for draining the cooling water after having had the portion of the amount of heat transferred thereto;
the last mentioned means further include a first recycle line having an inline pump, the first recycle line communicating between the drain of the first of the at least two sequential cooling stages and the phase separation tank for recycling the cooling water back to the phase separation tank, and a second recycle line communicating between the bottom of the phase separation tank and the inlet of the pump; and
the source of cooling water is formed by cooling water accumulated in the phase separation tank.

5. The improvement of claim 3, wherein:
the phase separation tank has a top wall having two openings, a duct connected to the top wall in alignment with one of the two openings for venting the cryogenic vapor; and
the eductor means is connected to the top wall with its discharge opening aligned with the other of the two openings.

6. The improvement of claim 5, wherein:
the cryogenic vapor is drawn into the cooling water at a rate proportional to a pressure difference of the cryogenic vapor as measured between a point at which the cryogenic vapor enters the eductor means and at the discharge opening of the eductor means; and
the duct of the phase separation tank has a damper to open and close the duct and thereby decrease and increase the pressure difference within the eductor means and thus, the rate at, which cryogenic vapor is drawn thereby.

7. The improvement of claim 4, wherein:
The phase separation tank has a top wall having two openings, a duct connected to the top wall in alignment with one of the two openings for venting the cryoqenic vapor; and
the eductor means is connected to the top wall with its discharge opending aligned with the other of the two openings.

8. The improvement of claim 7, wherein:
the cryogenic vapor is drawn into the cooling water at a rate proportional to a pressure difference of the cryogenic vapor as measured between a point at which the cryogenic vapor enters the eductor means and at the discharge opening of the eductor means; and
the duct of the phase separation tank has a damper to open and close the duct and thereby decrease and increase the pressure difference within the eductor means and thus, the rate at which cryogenic vapor is drawn thereby.

9. The improvement of claim 8, wherein:
the cryogen comprises liquid nitrogen;
the first of the at least two sequential cooling stages comprises a hydrocooler formed by a water tank;
the second of the at least two sequential cooling stages comprises a covered trouth-like liquid nitrogen immersion freezer having an inlet pipe for receiving liquid nitrogen and a vent pipe for venting nitrogen vapor; and
the eductor means is connected to the vent pipe.

10. In a method of refrigerating food comprising:
supplying a cryogen;
supplying cooling water at a temperature lower than that of the food to define a temperature difference between the food and the cooling water; and
transferring an amount of heat from the food, sufficient to refrigerate the food, in at least two sequential cooling stages by,
transferring a portion of the amount of heat from the food to the cooling water in the first of the at least two-cooling stages at a rate proportional to the temperature difference between the food and the cooling water, and
transferring a remaining portion of the amount of heat from the articles to the cryogen so that a quantity of the cryogen boils off into a cryogenic vapor and is thereby expended in the second of the at least two sequential cooling stages; the improvement comprising:
pumping the cooling water through eductor means connected to the second of the at least two sequential cooling stages for drawing the cryogenic vapor into a mixture with the cooling water and thereby transferring further heat form the cooling water to the cryogen vapor to increase the temperature difference between the food and the cooling water; and
after the further heat transfer between the cooling water and the cryogenic vapor delivering the cooling water from the eductor means to the first of the at least two sequential cooling stages, whereby the portion of the amount of heat transferred from the food to the cooling water is increased and the remaining portion of heat transferred from the food to the cryogen is thereby reduced along with the quantity of the cryogen expended.

11. The improvement of cliam 10, wherein during the delivery of the cooling water to the first of the at least two cooling stages the cryogenic vapor is separated from the cooling water.

* * * * *

UNITED STATES PATENT AND TRADEMARK OFFICE
CERTIFICATE OF CORRECTION

PATENT NO. : 5,218,826
DATED : June 15, 1993
INVENTOR(S) : Kirschner et al

It is certified that error appears in the above-indentified patent and that said Letters Patent is hereby corrected as shown below:

Col. 8, line 63, delete "coils" and substitute "boils" therefor.

Col. 9, lines 7 and 10; and Col. 10, line 52, delete "form" and substitute "from" therefor, each instance.

Col. 10, line 5, delete "cryoqenic" and substitute "cryogenic" therefor.

Col. 10, line 64, delete "cliam" and substitute "claim" therefor.

Signed and Sealed this

First Day of March, 1994

Attest:

BRUCE LEHMAN

*Attesting Officer*  *Commissioner of Patents and Trademarks*